3,210,376
BISPHENOLIC LACTONES
Robert V. Smith, Racine, Wis., assignor to
S. C. Johnson & Son, Racine, Wis.
No Drawing. Filed Aug. 2, 1962, Ser. No. 214,206
7 Claims. (Cl. 260—343.6)

This invention relates to 3-(1-methyl-1-hydroxyethyl)-6,6'(hydroxyaryl)heptanoic acid-γ-lactones, to their method of preparation and derivatives thereof.

The novel acid-γ-lactones, hereinafter referred to as bisphenolic lactones, have the structure

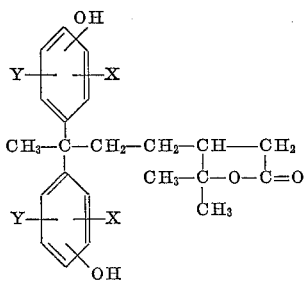

wherein $x$ and $y$ are members of the group consisting of hydrogen, lower alkyl groups of from 1–7 carbon atoms in a carbon-to-carbon chain, halogen and nitro groups. The bisphenolic lactone contains two reactive hydroxyl groups and readily undergoes reactions on the ring structure characteristic of phenols. The lactone structure, which may be opened to function as a carboxyl group, is surprisingly stable. Thus, ordinarily, it would be expected that in the presence of a strong base, such as the alkali hydroxides, the lactone ring would open. Surprisingly, however, the instant bisphenolic lactone reacts with epichlorohydrin in the presence of aqueous alkali metal hydroxides to produce the diglycidyl bisphenolic lactone. This characteristic is unpredictable, it ordinarily being expected that under the conditions of the reaction, the lactone ring would open to form a carboxyl group. The presence of the carboxyl group, which is highly reactive with epoxide groups, would require careful control of reaction conditions to obtain any substantial epoxide content. Thus, the characteristic of the novel bisphenolic lactones which permits the preparation of diglycidyl ethers in substantial yields, but yet allows reactions common to a carboxyl group, is particularly noteworthy and highly unexpected. The diglycidyl bisphenolic lactones are commercially significant since they convert readily in the presence of a polyamine or dibasic acid to give a hard, flexible, chemically resistant, resinous product.

The structure of the bisphenolic lactones disclosed herein is substantially symmetrical contributing to the compound's relatively high melting point. Additionally, the partially aliphatic and aromatic combination of structure has a favorable influence on the characteristics of derivatives of the lactone in regard to hardness, flexibility and solubility in organic solvents. More importantly, the instant bisphenolic lactone is polyfunctional. Chemical reactions will take place at up to seven reactive sites, depending upon whether the benzene rings of the lactone are substituted or unsubstituted. Thus, the unsubstituted compound has four condensable hydrogens, two on each benzene ring, two phenolic hydroxide groups and the γ-lactone group which will open to form a reactive carboxyl group.

The condensable hydrogens on the benzene ring will undergo many reactions including aldehyde condensation, carboxylation to form a polycarboxylic acid and Mannich base reactions in addition to the expected preparation of analogues.

Phenolic esters can be formed by esterification with carboxylic acids or the acid chloride. If the acid is employed, the reaction can be accelerated by using acetic anhydride as a condensing agent. The phenolic hydroxyl groups also react with alkyl halides or halo acids to form ethers. The ethers in turn will undergo a Claisen-type rearrangement to provide modified products. Furthermore, as noted hereinbefore, the instant bisphenolic acid lactones readily react with epichlorohydrin through the phenolic hydroxyl groups, in the presence of an alkali to form a diglycidyl compound. This phenomenon is unexpected.

The γ-lactone group on the novel bisphenolic lactone opens to form a carboxyl group. The carboxyl group takes part in reactions common to carboxyl groups, including esterification with mono- and polyhydric alcohols, amidification with mono- and polyamines, and acid hydrazide formation, providing numerous useful compositions. Thus, as will become more apparent from the additional discussion and examples set forth hereinafter, the subject bisphenolic lactones and derivatives thereof have utility in the protective coating field, as adhesives, as oil additives, plasticizers, surface active agents, flame retardants and extinguishing agents, pharmaceutical products, extenders for polymers, agriculture chemicals, and in the textile industry.

The instant bisphenolic lactones are prepared by the condensation of a phenol and pinonic acid or methylhomoterpenyl ketone in the presence of a hydrogen source. The lactone precipitates from the reaction medium and is recovered by washing and drying. Thus, the reaction of phenol and pinonic acid can be depicted as follows:

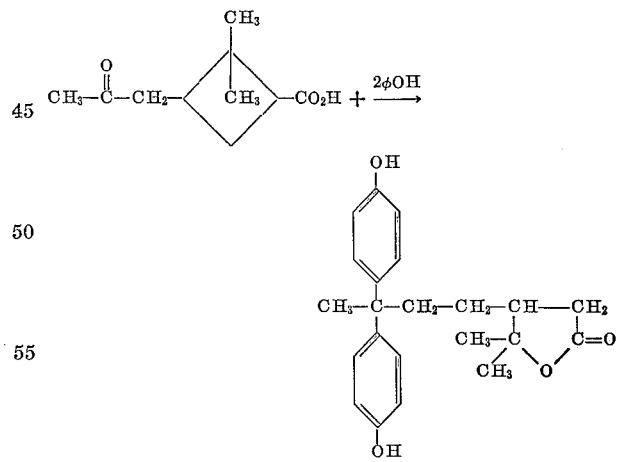

As illustrated in the diagrammatic drawing, quite unexpectedly, rather than forming a novel diphenolic acid, a lactone structure is obtained. This lactone group, as noted hereinbefore, is surprisingly stable in an alkaline or acid medium but, in contradistinction, readily opens by heating or in the presence of select agents to provide a reactive carboxyl group. It is theorized that in the above reaction pinonic acid undergoes an in situ rearrangement forming methylhomoterpenyl ketone which in turn condenses with phenol. This assumption is substantiated by the fact that methylhomoterpenyl ketone and phenol produce a bisphenolic lactone identical to that prepared from pinonic acid. Thus, the reaction of pinonic acid apparently proceeds as follows:

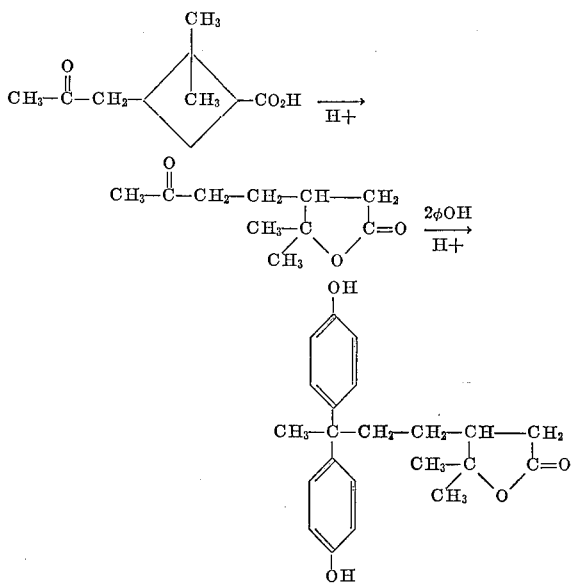

In general, the process of the instant invention comprises reacting pinonic acid with a phenol in the presence of a mineral acid condensing agent such as hydrochloric acid, hydrobromic acid, phosphoric acid, sulphuric acid or the like. Although the strong mineral acids are preferred, the invention also includes the use of strong organic acids such as chloroacetic acid. Adjustment of the ratio of pinonic acid or methyl homoterpenyl ketone and phenol, as well as the concentration of mineral acid in the reaction medium is not particularly critical. The amounts of acids employed as a hydrogen source usually are from about 5 to 50% by weight based on the reactants. However, a higher percentage can be employed, depending upon economical considerations.

The strength of the mineral acid can be varied, depending upon the acids available and their corrosive effect upon the reaction vessel. For example, using hydrochloric acid, the strength can range from about 32% as the lower practical limit up to, and including the use of gaseous hydrogen chloride in an anhydrous medium. Use of hydrochloric acid of lower strength requires longer reaction times and/or higher reaction temperatures, usually resulting in products having a lower degree of purity. When anhydrous hydrochloric acid is employed, the expense of the starting material is increased and, furthermore, such acids are highly corrosive to the processing equipment, particularly once water of reaction is present. Therefore, the acid strength, from a practical standpoint, is from about 36–60%.

The acid catalyst in an aqueous medium can serve as the reaction medium, as well as the condensing agent. If this is the case, the minimum ratio of condensing acid to pinonic acid for any specific strength is determined in part by the minimum value of acid which will permit sufficient reaction. As is apparent the proper selection of acid can vary over relatively wide ranges, based on numerous considerations. The choice is within the ability of one skilled in the art, using the instant disclosure as a guide.

Substantially stoichiometric ratios of phenol to pinonic acid or methyl homoterpenyl ketone are preferred in the instant reaction. When susbtantially stoichiometric amounts of the reactants are used, the product is more readily produced in purified form. In other words, it is not necessary to employ elaborate purification and crystallization procedures to remove the excess reactants. However, it is possible to employ either the pinonic acid or phenol in excess. As a rule of thumb, one can employ from about 1.0 to 4.0 mols phenol per mol pinonic acid.

In the instant process, the rate of reaction under given conditions increases with increasing temperatures, ranging from about room temperature to reflux. It is desirable, however, to operate at the lowest possible temperature consistent with practical time requirements, since at higher temperatures side reactions become more prevalent, producing isomeric compounds. Thus, preferably, the reaction will be carried out in the neighborhood of from about 40–75° C. At these temperatures, a substantially pure product is obtained when the reaction is terminated after about 12–58 hours. However, depending upon the particular phenols employed, the reaction times can range from as low as about eight hours up to several days. As is apparent, the reactions of some of the substituted phenols may require longer reaction times and more severe processing conditions.

In the instant reactions, it can be desirable at times to employ a secondary catalyst. It has been found, for example, that the presence of a mercaptan selected from the group consisting of methyl mercaptan, ethyl mercaptan, mercapto-propionic acid, and mercapto-acetic acid will substantially reduce the reaction times, and provide an improved yield. The catalyst can be present in an amount over a relatively wide range, usually from about 0.01 to about 0.30 mol catalyst per mol pinonic acid. Concentrations below the above range are usually substantially ineffective whereas concentrations above the stated range do not appreciably increase the rate of reaction. Therefore, while higher ratios can be employed, the increase in cost and the difficulty in removing the catalyst from the final product exceeds any advantage recognized. While the above-mentioned catalysts are preferred, additional condensation catalysts known in the art can be used.

The following example will illustrate a preferred embodiment of the invention, describing the preparation of 3 - (1-methyl - 1-hydroxyethyl)-6,6'-(4-hydroxyphenyl) heptanoic acid-γ-lactone.

*Example 1*

184 grams (1 mol) pinonic acid and 188 grams (2 mols) phenol are heated in the presence of 220 ml. 37% hydrochloric acid for 24 hours in the temperature range of 60–65° C. At the end of the 24 hours, the reaction mixture is poured into water and steam distilled; removing any excess phenol. The residue is dissolved in 1.0 mol sodium hydroxide and precipitated by the dropwise addition of sulfuric acid. The precipitate is washed in hot water and dried. The yield of the crude product amounted to 96% of theoretical. The crude product is recrystallized from a solution of dichloroethane to provide a purified product upon drying, having a melting point of 161–163° C., a molecular weight of 351 as determined by hydroxyl determination, a carbon content of 73.98, a hydrogen content of 7.35 as compared with calculated values of 74.58 and 7.40, respectively. An infrared analysis determined a carbonyl adsorption band at 1735 cm.$^{-1}$ in the solid state and at 1765 cm.$^{-1}$ in solution.

In Example 1, the unsubstituted phenol can be replaced by other phenols including the cresols, 2,6 diisopropyl phenol, and 3,5 xylenol to produce analogues of the bisphenolic lactone prepared in Example 1. In general, operable phenols have the formula:

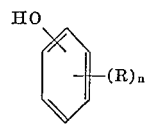

wherein R is a member of the group consisting of a lower alkyl radical (1–7 carbon atoms in a carbon-to-carbon chain), halogen and nitro, and $n$ is a member of the group consisting of 0, 1 and 2. In addition, the pinonic acid can be replaced by methyl-homoterpenyl ketone to produce the same lactone. Thus, the resultant bisphenolic lactone will have the structure:

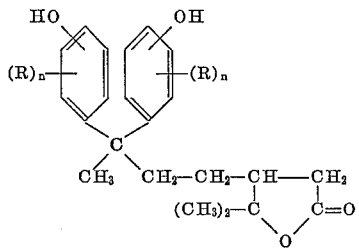

where R and $n$ have the same values as indicated above.

As expected, the bisphenolic acid lactones derived from unsubstituted phenol have different properties in comparison to lactones derived from substituted phenols. Thus, a bisphenolic lactone having at least one alkyl group on each benzene ring will be less hydrophilic than the unsubstituted lactone and ordinarily will have a lower melting point due to the increased carbon content and lower degree of symmetry. In undergoing chemical reaction, compounds prepared from substituted phenols, having fewer reactive sites, provide substantially modified products. Thus, in reactions with formaldehyde, the bisphenolic lactone prepared from unsubstituted phenol will readily form a cross-linked thermoset resin, whereas the bisphenolic lactone prepared from cresol will form linear thermoplastic resins. As is apparent, by judicious selection of the starting phenol, advantageous variations can be incorporated into the derivatives. The chlorinated and nitrated compounds provide numerous peculiar characteristics to the final derivatives. These characteristics and features will become more apparent hereinafter.

The following examples illustrate reactions and derivatives of the lactones made by the procedure of Example 1.

Example 2

17.7 grams (0.05) of the bisphenolic lactone of Example 1 were dissolved in 100 ml. of normal butanol and thereafter treated with 32.0 grams (0.4 mol) bromine at room temperature. Upon standing, 29.4 grams (88% of theoretical) of a crystalline product having a melting point of 187–193° C. was obtained. An analysis of the product indicated that 4 mols of bromine had been added to the starting compound to give the tetrabromo bisphenolic lactone. Infrared analysis indicated that the addition occurred in the phenolic rings.

Example 3

17.7 grams (0.05 mol) of the bisphenolic lactone of Example 1 were dissolved in 200 ml. of dichloroethane and contacted with chlorine gas until 7.0 grams (0.20 gram atoms) were added. Upon standing at room temperature, a crystalline material precipitated from the solution. Upon drying, 22.1 grams (90% of theoretical) of a product having a melting point of 191–192° C. were obtained. Chlorine analysis indicated the presence of 4 mols of chlorine to provide the tetrachlorinated bisphenolic lactone. Infrared analysis of the product indicated that the addition of chlorine occurred in the phenolic rings.

The halogenated compounds obtained in Examples 2 and 3 have utility as intermediates in the preparation of fire retardant paints, as corrosion inhibiting agents, as wood preservatives and as insecticides, fungicides and herbicides.

Example 4

177 grams (0.5 mol) of the bisphenolic lactone of Example 1 and 450 parts of glacial acetic acid are charged to a three neck flask equipped with thermometer and agitator. 270 parts benzene were added to the charge before cooling to 0° C. in an ice bath. At this temperature, dropwise addition of 84 parts 70% nitric acid diluted with 66 parts glacial acetic acid is begun. The complete addition required 3 hours and 45 minutes with the reaction temperature never exceeding 0° C. The reaction charge at the end of the addition is a dark reddish solution. The charge is maintained at temperatures between 5 and 20° C. for approximately 12 hours. At the end of this time, a heavy precipitate is formed. The precipitate is filtered and washed three times with distilled water before vacuum drying. The crude reaction product has a nitrogen content indicative of dinitro-bisphenolic lactone.

The resultant bisphenolic lactone has utility in the preparation of fungicides, insecticides, herbicides, and constituents in protective coatings and adhesives.

Example 5

37.5 grams (0.11 mol) of the bisphenolic lactone of Example 1 were dissolved in 300 ml. of 1.1 normal sodium hydroxide and 40 ml. of dimethylsulfate. The mixture was stirred and refluxed for three hours. Upon cooling to room temperature, an oily liquid separated which was washed with water and dried under vacuum over sulfuric acid. 36.4 grams of material were obtained which distilled at 231° C./0.05 mm. The sample was analyzed by infrared and the carbonyl adsorption band of the lactone ring is observed at 1765 cm.$^{-1}$. The spectrum indicates the compound to be the dimethylether of the original bisphenolic lactone. The composition was found to have a carbon content of 75.28 and hydrogen content of 7.87 as compared to the calculated values of 75.39 and 7.85 respectively.

In the above example, the dimethylsulfate can be replaced by diethylsulfate, methyl chloride, ethyl chloride, butyl chloride, amyl chloride, ethylhexyl chloride, allyl chloride, phenyl-2-ethylether, 1,3 - dichloro - butane, 2-methallyl chloride and 1-chlorobutane 2.

The etheric compounds prepared above are particularly advantageous, in the resinous state, as constituents in protective coatings and moldings since they are compatible with the unsaturated drying oils normally used as plasticizers while still imparting to the cured product good gloss, hardness and chemical resistance.

Example 6

177 grams (0.5 mol) of the bisphenolic lactone of Example 1 were dissolved in 462.5 grams (5.0 mols) of epichlorohydrin and 55 grams of isopropanol. The mixture is heated to reflux and 88 grams (1.1 mols) of aqueous sodium hydroxide added over a period of 60 minutes. The mixture is washed with water followed by stripping off any remaining water by heating to a temperature of 150° C. and holding for 35 minutes. The product amounted to 211 grams of a light yellow resin having an epoxide equivalent weight of 261 (theoretical=231).

This reaction is surprising since one would expect the lactone structure to open under the alkaline conditions of the reaction, destroying the oxirane groups as formed. It would be predicted that an epoxide composition could only be obtained by carefully controlling the reaction, and by blocking the carboxyl group.

In the above example, the epichlorohydrin can be replaced by 1,2 epoxy 3,4 epoxy butane, epibromohydrin and 2,3 epoxypropyl-2'-hydroxy-3'-chloropropyl ether.

The instant epoxy compositions are readily converted by heating with polyamines, dibasic acids, or polyamides to provide hard, infusible, chemical resistant compositions. In the presence of a polyamine or polyamide, the lactone group will open to provide an additional reactive functional group, permitting cross-linking. The composition can be used to modify conventional alkyl type resins or as plasticizers. Due to the rapid curing characteristics, the materials having an unusually high degree of utility.

Example 7

11.3 grams (0.3 mol) sodium borohydride were placed in a dry, 3-neck, 500 ml. round bottom flask and 300 ml. diglyme were added. The mixture was heated to 70° C. and held while stirring for two hours. 21 grams (0.06 mol) of the bisphenolic lactone of Example 1 as a solid, were added to the sodium borohydride solution. The sodium phenate salt formed at once. 13.3 grams (0.1 mol) of aluminum chloride dissolved in 50 ml. of diglyme were added to the sodium phenate suspension over a period of about 5 minutes. No exotherm was detected. The mixture was heated to 80° C. and held while stirring for 10 hours. The reaction mixture was poured on one liter of ice containing 60 ml. of concentrated hydrochloric acid. The reaction mixture was extracted with three 200 ml. portions of ether, and the ethereal extracts washed with 50 ml. portions of water, the residues being combined and dried over anhydrous sodium sulfate. Infrared examination of the crude product disclosed no carbonyl adsorption. The product had a melting point of 80–90° C. Infrared analysis indicated that a diol had been formed.

The resultant product had utility as an intermediate in the preparation of protective coatings, adhesives and plasticizers. The diol can be reacted with an epoxy-forming compound, such as epichlorohydrin, to form a self-converting epoxy resin.

Example 8

25 parts of the crude compound of Example 1 are refluxed with 27 parts of 37% aqueous formaldehyde in a butanol medium for one hour and 30 minutes. Water of reaction is stripped off by means of a vacuum aspirator. The resultant product is a resinous, sirupy, amber material.

The resultant product is dissolved in a mixture of butanol and methylethyl ketone to give a 50% non-volatile solution. A thin film, 0.002 inch wet thickness is spread on a metal plate and cured for 30 minutes at 150° C. in a draft oven. The resultant thermoset film is resistant to acid, alkali and water.

Additional formaldehyde condensates can be prepared, employing a fairly wide ratio of formaldehyde per molecule of bisphenolic lactone. The ratio selected depends upon the characteristics desired in the final product. For example, valuable materials are prepared using from 0.5 to 5 molecules of aldehyde per molecule of bisphenolic lactone.

Formaldehyde in the above examples can be replaced by other aldehydes including acetaldehyde, propionaldehyde, n-butyraldehyde, iso-butyraldehyde, valeraldehyde, heptaldehyde and furfural. However, because of commercial availability, as well as its great activity, formaldehyde is preferred.

Example 9

Two mols of linseed oil fatty acids converted to the corresponding acid chlorides are reacted with one mol of the bisphenolic lactone of Example 1. The reaction is carried out by heating the reaction charge, with agitation, to a temperature of about 150° C. and holding for a period of about 4 hours. Hydrochloric acid is removed from the reaction medium as it is formed by means of a water aspirator. The resultant product is a viscous resinous material.

In the above example, the linseed oil fatty acids can be replaced by saturated and unsaturated long chain fatty acids, including soya fatty acids, dehydrated castor oil acids, chinawood oil acids, corn oil acids, cottonseed oil acids and undecenoic acid. The novel diester acids formed have utility as plasticizers in resinous compositions. Additionally, the unsaturated diester acids can be employed to impart air drying or heat converting characteristics to a composition while still providing flexibility. Furthermore, the olefinic bonds can be epoxidized to produce novel polyepoxides having a favorable combination of aliphatic and aromatic characteristics.

Example 10

Two mols of the bisphenolic lactone of Example 1 are reacted with one mol ethylene glycol by heating the reaction charge with agitation to a temperature of about 210° C. The temperature is maintained for a period of about eight hours. The resultant product is resinous tetrahydric phenol.

In Example 10 the ethylene glycol can be replaced by other polyhydric alcohols including glycerol, pentaerythritol, propylene glycol, 1,4-butane diol, 2,5-pentane diol, neopentyl glycol, and polypropylene glycol. The polyhydric phenols of the examples have utility in the preparation of alkyd resins and as epoxide converting agents. Additionally, the polyhydric phenols can be reacted with unsaturated fatty acids or the acid chloride to provide resinous compositions having air curing characteristics useful as protective coatings and adhesives. The polyhydric phenols can be reacted with an epoxy forming compound, such as epichlorohydrin, to form epoxy resins having an average of more than two epoxide groups per molecule. The epoxide resins, due to their high epoxy content and combination of aliphatic and aromatic characteristics, are excellent for the preparation of protective coatings.

Example 11

A mixed ester of the novel bisphenolic lactones is prepared by reacting one mol of the lactone of Example 1 with two mols linseed oil fatty acid and one mol glycerol. The reaction is carried out by charging the reactants to a flask and heating to a temperature in the range of about 210° C. and holding for approximately 10 hours with constant agitation. An inert gas is passed over the reaction medium to prevent oxidation of the unsaturated acid. The reaction charge is held for an acid value below 10. A resinous product is obtained.

The mixed esters can be admixed with a suitable drier, such as a cobalt drier, and air cured or baked to give a hard thermoset film. Additionally, the esters can be employed to modify alkyd resins. Since the lactone ring is not opened under normal conditions, a low acid value can be obtained. The only residual acid content in the resin comes from the modifying acid.

Example 12

A mixture of one mol of the bisphenolic lactone of Example 1, 0.5 mol succinic anhydride and 1.1 mols of ethylene glycol is esterified to an acid value of 8.

In Examples 11 and 12, the polyhydric alcohol can be replaced by other polyhydric alcohols including glycerol, pentaerythritol, dipentaerythritol, propylene glycol, 1,4-butane diol, 2,5-pentane diol, neopentyl glycol, and polypropylene glycol. The succinic acid of Example 12 can be replaced by other polybasic acids including maleic anhydride, tetrahydrophthalic acid, azelaic acid, sebacic acid, and the dimerized vegetable oil acids which are essentially 36 carbon atom aliphatic dibasic acids produced by the combination of two unsaturated 18 carbon atom vegetable oil acids through their olefin groups.

The instant novel polyhydric phenols have utility as modifiers for alkyd resins or as resinous plasticizers. Since the compositions possess reactive hydroxyl groups, they can be chemically bonded to the material being plasticized, thereby preventing leaching and minimizing incompatibility. The polyhydric phenols can be modified with long chain fatty acids to impart drying characteristics. Illustrative operable fatty acids include linseed oil acid, chinawood oil acid, soyabean oil acid and cottonseed oil acid. The modified compositions can be employed as protective coatings.

Example 13

One mol of the bisphenolic lactone of Example 1 and 0.5 mol ethylene diamine are charged to a reaction flask and heated to a temperature of about 210° C. with constant agitation to produce a resinous polyamide.

The polyhydric phenol amides have utility as a constituent in protective coatings, molding compositions and adhesives. When the novel polyhydric phenol amides are reacted with unsaturated fatty acids, air drying characteristics are imparted, which materials, when treated with a drier and spread on glass panels and baked, provided hard, thermosetting films highly resistant to boiling water and aqueous sodium hydroxide.

In the above example, the dichlorobutane can be replaced by other di-halides including 1,2 dichloro-ethane, 1,2 dichloro-propane, 1,4 dichloro-butene-2, glycerol dichloro-hydrin, $\beta,\beta$,dichlorodiethyl ether and epichlorohydrin. Additionally, by varying the ratio of the dichloride to the bisphenolic lactone, polymeric products can be obtained directly. Thus, the acids will have the generic formula:

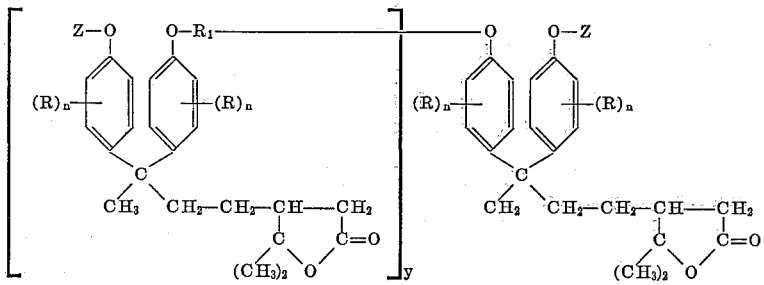

Example 14

A mixture of one mol of the bisphenolic lactone of Example 1, one mol of linseed oil fatty acids and one mol of diethylene triamine are heated at 100° C. for 14 hours to obtain a resinous reaction product. The co-amides formed have utility as converting agents for polyepoxides and as resinous plasticizers.

In Examples 13 and 14, the polyamine can be replaced by other aliphatic and aromatic polyamines including trimethylenediamine, propylene diamine, 1,2 tetramethylene diamine, hexamethylene diamine, triethylene tetraamine, p-phenylene diamine, tri(p-aminophenyl) methane and aminobenzyl-phenylene amine.

Example 15

One mol of the bisphenolic lactone of Example 1 is reacted with two mols chloroacetic acid in an aqueous sodium hydroxide medium to produce the dicarboxylic acid having the structure:

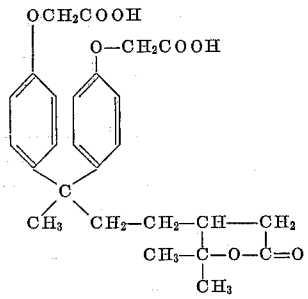

The above acid has utility as an epoxide converting agent as well as a constituent of an alkyd resin. In the above example, the chloroacetic acid can be replaced by $\alpha$-chloropropionic acid, 2-chlorocaprylic acid and 2-bromovaleic acid.

Example 16

One mol of the reaction product of Example 1 and 0.5 mol 1,4-dichlorobutane are charged to a suitable reaction vessel in the presence of 2.5 mols sodium hydroxide dissolved in 400 parts water. The reaction charge is heated to 130° C. in a suitable autoclave and held for about four hours. The reaction charge is then neutralized with hydrochloric acid and the aqueous layer removed by decantation. After washing three times with hot water, the resinous product is dried by heating to 130° C. in a forced air oven. The resultant product is a resinous material which undergoes the reactions of an acid.

wherein R is lower alkyl halogen or nitro, $n$ is 0, 1, or 2, $R_1$ is lower alkylene, hydroxy lower alkylene or lower alkylene ether, Z represents hydrogen or lower alkyl, and $y$ is an integer determined by the ratio of reactants.

Wherein $R_1$ is an aliphatic divalent radical selected from the group consisting of hydrocarbon, oxahydrocarbon, hydroxyl substituted hydrocarbon and hydroxyl substituted oxahydrocarbon radicals of from 2–10 carbon atoms; Z is a member of the group consisting of hydrogen and Cl—$R_1$—, wherein —$R_1$ is as above defined; $y$ has a value of 1–15, and the remaining elements have the values described hereinbefore.

The reaction products of Examples 15 and 16 above, have excellent potential as film formers in aqueous floor polishing emulsions. Thus, the lactone ring will close when the emulsion is placed on the floor, being insoluble in water and weak bases such as household soaps and detergents. However, when touched with a stronger alkali, such as sodium hydroxide or ammonia, the lactone ring will open, solubilizing the film-forming resin, thereby permitting its selective removal.

In Examples 2–16, the bisphenolic lactone can be replaced by any of the lactones falling within the general formula set forth, see column 5, lines 8–18, to provide modified derivatives including 3-(1-methyl-1-hydroxyethyl)-6,6'(4-hydroxy-3-ethylphenyl)heptanoic acid-$\gamma$-lactone,
3-(1-methyl-1-hydroxyethyl)-6,6'(4-hydroxy-2-ethylphenyl)heptanoic acid-$\gamma$-lactone,
3-(1-methyl-1-hydroxyethyl)-6,6'(2-hydroxy-4-butylphenyl)heptanoic acid-$\gamma$-lactone,
3-(1-methyl-1-hydroxyethyl)-6,6'(2-hydroxy-3-nitrophenyl)heptanoic acid-$\gamma$-lactone,
3-(1-methyl-1-hydroxyethyl)6,6'(4-hydroxy-3-methylphenyl)heptanoic acid-$\gamma$-lactone,
3-(1-methyl-1-hydroxyethyl)-6,6'(4-hydroxy-3-amylphenyl)heptanoic acid-$\gamma$-lactone, and
3-(1-methyl-1-hydroxyethyl)-6,6'(4-hydroxy-3-chlorophenyl)heptanoic acid-$\gamma$-lactone.

A number of other reactions are possible with the novel lactones of the instant invention to produce a wide variety of novel and useful products. These materials will be apparent to one skilled in the art. The foregoing examples are furnished only for the guidance of those seeking to practice the invention and not for defining the boundaries within which it is operative. Numerous other embodiments are possible and will be suggested by these illustrations.

Having described the invention, what is claimed is:

1. A compound of the structure:

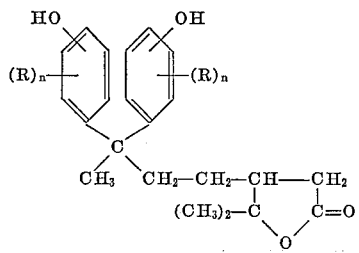

wherein R is a member of the group consisting of lower alkyl, halogen and a nitro group and $n$ is a member of the group consisting of 0, 1 and 2, the hydroxyl group being attached to the 4 position of the ring strucure when $n$ is 0.

2. 3-(1-methyl-1-hydroxyethyl)-6,6'(4 hydroxyphenyl) heptanoic acid-γ-lactone.

3. A compound of the structure:

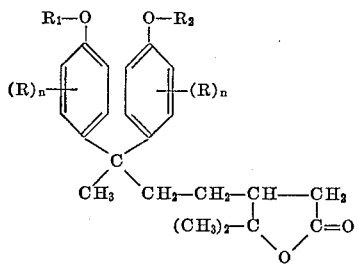

wherein $R_1$ is a member of the group consisting of hydrogen and lower alkyl; $R_2$ is lower alkyl; R is a member of the group consisting of lower alkyl, halogen and a nitro group, and $n$ is a member of the group consisting of 0,1 and 2.

4. A compound of the structure:

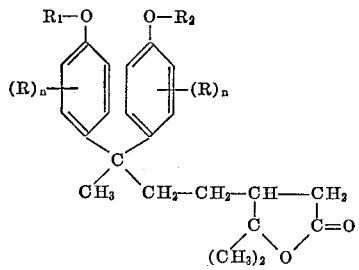

wherein $R_1$ is a member of the group consisting of hydrogen,

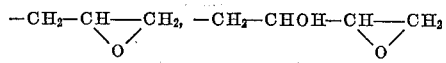

and —$CH_2$—CHOH—$CH_3$; $R_2$ is a member of the group consisting of

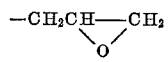

and

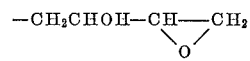

R is a member of the group consisting of lower alkyl, halogen and a nitro group and $n$ is a member of the group consisting of 0, 1 and 2.

5. A compound of the structure:

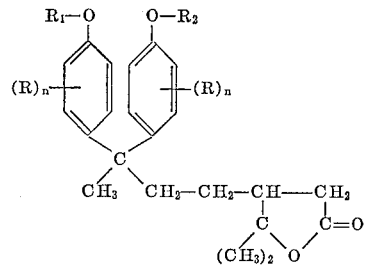

wherein $R_1$ is a member of the group consisting of hydrogen and —W—COOH, W being lower alkylene; $R_2$ is —W—COOH, W being lower alkylene; R is a member of the group consisting of lower alkyl, halogen and a nitro group; and $n$ is a member of the group consisting of 0, 1 and 2.

6. A compound of the structure:

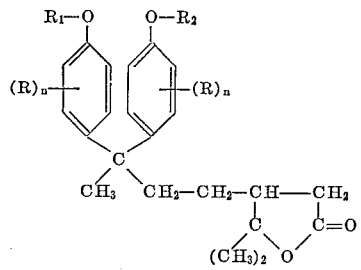

wherein $R_1$ is a member of the group consisting of hydrogen and an alkyl of 10–36 carbon atoms; $R_2$ is an alkyl of 10–36 carbon atoms; R is a member of the group consisting of lower alkyl, halogen and a nitro group; and $n$ is a member of group consisting of 0, 1 and 2.

7. A compound of claim 6 wherein the alkyl of 10–36 carbon atoms is ethylenically unsaturated.

References Cited by the Examiner

UNITED STATES PATENTS

| | | | |
|---|---|---|---|
| 2,564,191 | 8/51 | De Groote et al. | 260—51 |
| 2,674,590 | 4/54 | Zenftman | 260—61 |
| 2,728,746 | 12/55 | Unruh | 260—78.3 |
| 2,926,173 | 2/60 | Patrick et al. | 260—343.6 |
| 3,037,000 | 5/62 | Bannerman | 260—78 |
| 3,072,606 | 1/63 | Zuppinger et al. | 260—47 |

WALTER A. MODANCE, *Primary Examiner.*

NICHOLAS S. RIZZO, *Examiner.*